J. E. I. BAUDOUX.
AUTOMATIC TENSIONING DEVICE PARTICULARLY APPLICABLE TO CLUTCHES.
APPLICATION FILED AUG. 9, 1909.
945,301.
Patented Jan. 4, 1910.
2 SHEETS—SHEET 1.
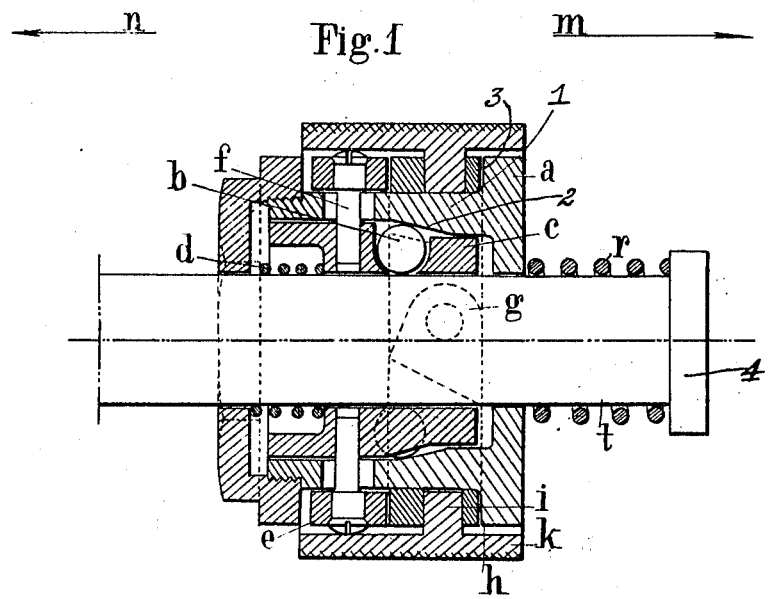
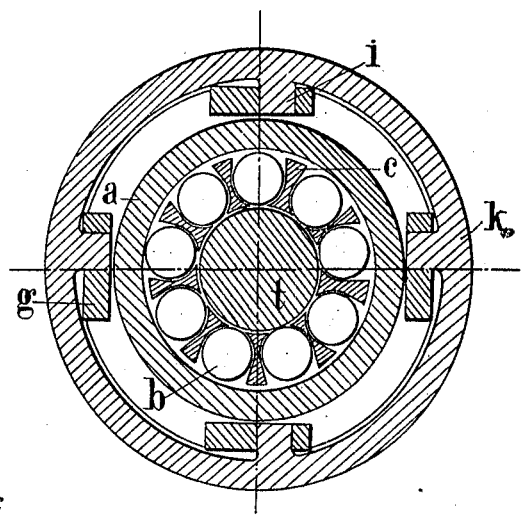
WITNESSES
INVENTOR
Joseph Eloi Isidore Baudoux
BY
ATTORNEY

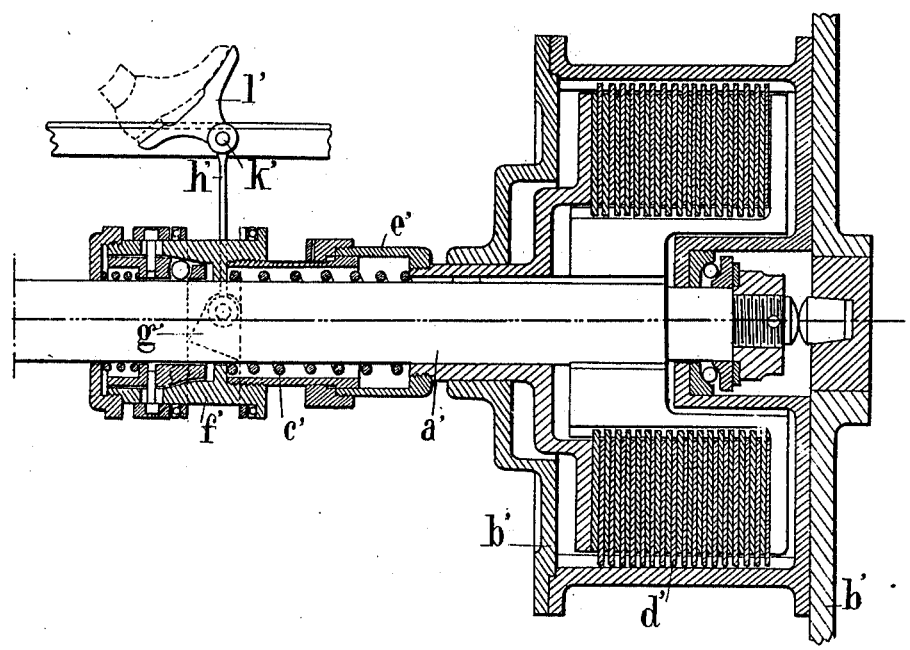

UNITED STATES PATENT OFFICE.

JOSEPH ELOI ISIDORE BAUDOUX, OF BOURGES, FRANCE.

AUTOMATIC TENSIONING DEVICE PARTICULARLY APPLICABLE TO CLUTCHES.

945,301. Specification of Letters Patent. Patented Jan. 4, 1910.

Application filed August 9, 1909. Serial No. 512,017.

*To all whom it may concern:*

Be it known that I, JOSEPH ELOI ISIDORE BAUDOUX, 14 Rue de Nevers, Bourges, Cher, France, have invented a new and useful Improved Automatic Tensioning Device Particularly Applicable to Clutches, which is fully set forth in the following specification.

The rotating parts of certain machines are provided with springs which are mainly intended to produce clutch engagement. In order to eliminate any permanent axial thrust during running it is necessary to impart to these clutch springs a working tension which when determined it is impossible to modify subsequently without introducing permanent and prejudicial friction. By thus predeterminately tensioning the clutch spring a large number of objections arise, the least of which is to destroy a large part of the progressive action of the clutch.

The present invention has for its objects an automatic tensioning device rendering it possible to modify at will the tension of a spring mounted upon a movable shaft and to maintain this tension without any subsequent permanent axial thrust thereby resulting.

Figures 1 and 2 are respectively a longitudinal and a transverse section of the automatic tensioning device, and Fig. 3 is a longitudinal section which shows its special application to a clutch.

In Figs. 1 and 2, $t$ is a shaft carrying a spring $r$ which is to be placed under tension or released at will. This spring is maintained under tension by the automatic tensioning device constructed as follows:— A casing $a$ of the character shown in the drawing, has an annular flange 1, which latter is formed with an inclined face portion 2, engaged by a circular row of balls $b$ which under the influence of the spring $r$ become fixed between the shaft $t$ and the inclined face 2 of the box $a$. Spring $r$ encircles shaft $t$, and at one end engages an abutment 4, in the form of a collar on shaft $t$. A ball cage $c$ tends to press the balls $b$ into their fixed position by the intermediary of a small spring $d$, which encircles shaft $t$ and is confined between the rear end of casing $a$, and the cage. This cage is displaceable from the exterior by means of the ring $e$ connected with the cage $c$ by connecting pins $f$. Spacing devices $g$ are arranged in the space $h$ between the ring $e$ and the shoulder 3 on the part $a$. These spacing members are provided with an eye in which trunnions $i$ formed on the operating ring $k$ engage.

The operation of the device is as follows: The operator always imparts movement to the part $k$. If he wishes to compress the spring $r$ he moves $k$ in the direction indicated by the arrow $m$ (Fig. 1). By moving the ring $k$, ring $e$, is caused to bear upon the spacing devices $g$, which latter engage the shoulder 3, of the part $a$, the entire device being thus displaced in the direction of the arrow $m$ thereby compressing the spring $r$. The small inner spring $d$ maintains the ring of balls $b$ in contact with the shaft $t$, and with inclined face 2 of the box $a$. When the operator ceases to act the spring $r$ remains compressed without any lost or back motion. If, however, it is desired to reduce the tension of the spring $r$, the ring $k$ is moved in the direction indicated by the arrow $n$ (Fig. 1). At this point the difficulty resides in the release of the ball $b$ without supplementary wedging effort. Assuming that the ball $b$ is directly acted upon in the direction $n$ by means of a simple force F the tendency will be on the one hand to cause the ball to move toward the outer end of the inclined face 2, but on the other hand owing to friction, the ball will move the part $a$ toward $n$ with a supplementary force substantially equal to $\frac{F}{2}$ which becomes added to the force of the spring $r$ to increase the wedging which is to be eliminated. However, by acting by means of a couple simultaneously and in the opposite direction upon the ball $b$ and upon the box $a$ the following occurs: At the same time that the ball is drawn in the direction $n$ by the force L, the other force F of the couple will act upon the part $a$ in the direction $m$ to diminish the action of the spring $r$ up to the desired extent for causing the wedging effort to diminish and the carrying along effort to increase so that the ball is disengaged without wedging.

The necessary couple is furnished by the spacing members $g$, the operation of which is as follows: The operator by moving ring $k$, causes the trunnions $i$ to move the spacing members $g$ in the direction $n$ in rocking them. Due to the shape of these members $g$, the effect of this rocking movement is to manifestly separate the parts $e$ and $a$, the balls being disengaged by the couple thus produced. The entire device continues to move as long as the operator continues to act upon the ring $k$ in the direction indicated by the arrow $n$. As soon as the operator ceases to act upon the operating ring $k$, the device stops without lost or back motion.

This tensioning device is applicable to machines of all kinds where it is desired to balance or displace a force. It may be constructed in different ways by utilizing either balls or wedges of any suitable form. It can be mounted either outside or inside a cylinder or a solid body of any calibrated form and be applied to a plane surface, a curve or other surface.

Fig. 3 represents an application of the automatic tensioning device to a clutch comprising washers, the object of which is to render it progressive and adjustable at will during running, while eliminating the axial thrust. In this figure $a'$ and $b'$ are the two parts to be coupled. The object of the spring $c'$ is to cause the washers to frictionally contact, some of the washers being keyed to the shaft $a'$ and the others keyed to the part $b'$. the Spring $c'$ is contained in a telescopic box $e'$ of variable capacity. This box is rigidly secured to the locking device $f'$ which latter is keyed to shaft $a'$ upon which neither the box $e'$ nor the device $f'$ rotates. The spring $c'$ is compressed in its box in such a manner as to obtain a well defined initial pressure upon the washers and diminish the effective yield for a satisfactory engagement.

The spacing members $g'$ of the automatic tensioning device are rigid with a clutch fork $h'$ pivoted to the frame of the machine at $k'$. The device is operated by means of a pedal $l'$. If the operator presses with his heel on the pedal $l'$, he engages the clutch. If he presses with the point of his foot he releases the clutch.

Having now particularly described and ascertained the nature of my said invention and in what manner the same is to be performed, I declare that what I claim is:—

1. In combination with a shaft and a spring engaging member thereon, a casing slidingly mounted on the shaft, a coil spring encircling the shaft and disposed between one end of the casing and said spring engaging member, said casing having an interior inclined face, a series of balls for engagement with said inclined face encircling the shaft, a cage for containing the balls, a coil spring encircling the shaft bearing at one end against the cage and at its opposite end against the opposite end of the casing, a ring connected to said cage, an operating ring surrounding the casing, and a series of spacing members carried by said operating ring, so as to have rocking movement with respect thereto, said spacing members engaging said first named ring and the first named end of the casing.

2. In combination with a shaft and a spring engaging member thereon, a casing mounted on the shaft, a spring between the casing and spring engaging member, said casing having an inclined inner face, a series of balls engaging said face and the shaft, means to move said balls with respect to the inclined face, and means to resiliently hold said balls in engagement with the inclined face.

3. In combination with a revolving body having a compressible spring thereon, a second body carried thereby engaged with the spring and formed with an inclined face, a series of balls engaging the revolving body and said inclined face, and means whereby said second body and said balls may be moved simultaneously to compress the spring, and whereby the balls may be moved independently of the second body so as to be disengaged from the inclined face, to allow the second body to be moved so as to release the spring.

4. In combination with a body and a compressible spring thereon, a second body having a wedging face, means whereby the second body may compress the spring, wedging means between said first body and said wedging face to hold said parts against movement in one direction, and means to move said wedging means in the opposite direction independently of the second body to thereby allow the second body to move to release said spring.

5. In combination with a body and a compressible spring thereon, a second body, means whereby the second body may compress the spring, wedging means arranged between said bodies whereby the spring is held in compressed position, means to hold said wedging means in operative position, and means to operate said wedging means to inoperative position independently of the second body thereby to allow the second body to release the spring.

In testimony whereof I have signed this specification in the presence of two subscribing witnesses.

JOSEPH ELOI ISIDORE BAUDOUX.

Witnesses:
 EMILE LEDRET,
 H. C. COXE.